United States Patent
Lorente Botella et al.

(10) Patent No.: US 6,168,343 B1
(45) Date of Patent: Jan. 2, 2001

(54) DEVICE FOR FIXING KNOBS TO LEVER ARMS FOR GEARBOXES OF AUTOMOBILE VEHICLES

(75) Inventors: Octavi Lorente Botella, Granollers; Xavier Motger Graus, Barcelona, both of (ES)

(73) Assignee: Fico Triad, S.A., Barcelona (ES)

( * ) Notice: Under 35 U.S.C. 154(b), the term of this patent shall be extended for 0 days.

(21) Appl. No.: 08/732,268

(22) Filed: Oct. 23, 1996

(30) Foreign Application Priority Data

Feb. 23, 1995 (ES) .................................................... 9500356

(51) Int. Cl.⁷ ...................................................... G05G 1/06
(52) U.S. Cl. ......................... 403/321; 403/192; 403/345; 74/558.5; 74/523
(58) Field of Search ..................................... 403/326, 328, 403/329, 321, 322.1, 322.3, 188, 192, 193, 300, 301, 302, 345; 74/558.5, 523, 473.3

(56) References Cited

U.S. PATENT DOCUMENTS

| | | | |
|---|---|---|---|
| 4,896,556 | * | 1/1990 | Takada ..................................... 74/523 |
| 5,588,329 | * | 12/1996 | Nedachi ............................ 74/473.3 X |
| 5,740,586 | * | 4/1998 | Gomas ................................. 16/111 R |
| 6,058,797 | * | 5/2000 | Konig et al. ..................... 74/473.3 X |

* cited by examiner

Primary Examiner—Lynne H. Browne
Assistant Examiner—John R. Cottingham
(74) Attorney, Agent, or Firm—Michael J. Striker

(57) ABSTRACT

This fixing device includes a cylindrical core (1) provided with an axial orifice (4) through which the front end (10) of a lever arm (2) can slide with a snug fit. The core includes to the interior a positioning projection (11) and two axial extensions (13) provided with securing projections (14) and linked to a coaxial circular ring (17). The front end (10) of the lever arm (2) includes an axial groove (19) adapted to take the positioning projection (11), and on its centered portion (21) a coaxial securing groove (22) adapted to take said securing projections (14).

2 Claims, 3 Drawing Sheets

DEVICE FOR FIXING KNOBS TO LEVER ARMS FOR GEARBOXES OF AUTOMOBILE VEHICLES

TECHNICAL FIELD OF THE INVENTION

The present invention relates to a device for fixing knobs to lever arms for gearboxes of automobile vehicles. The fixing device of the invention is applicable to lever arms for manually actuated or automatic gearboxes.

BACKGROUND OF THE INVENTION

Known in the art are an extensive variety of embodiments of devices for fixing knobs to lever arms of gearboxes. In general, such fixing devices, in addition to their inherent fixing function, also permit during mounting of the knob on the lever arm the correct positioning of said knob, both in respect of the correct layout of distinguishing emblems or signs which it may include and requirements of an ergonomic nature, especially when the knob has a certain asymmetric configuration.

It is a usual practice for the knobs for gearbox lever arms to be made up of a hollow cylindrical core on which the handle is set. Furthermore, the lever arms are usually of basically tubular configuration. The core, moreover, may include means for fixing an apron or dust cover which covers the portion of the lever arm between the knob and the bodywork.

As examples of such embodiments of fixing devices, amongst others habitually used, the following may be mentioned:

devices in which the core and the free, or front, end of the lever arm have respective screw-threaded sections, the coupling being implemented by mutual screwing together;

devices in which, like those mentioned above, the core and the corresponding front end of the lever arm have respective threaded sections and are mutually coupled by screwing together, further using fasteners which, passing through the knob, fix it to said end;

and devices in which the core and the front end of the lever arm have a respective and complementary positioning guide, the coupling thereof being implemented by sliding of the knob with respect to said end and the position of both being fixed by means of securing pieces such as retainers.

In general, the known embodiments of fixing devices such as those described above present, totally or partially, the following disadvantages:

the coupling of the core with the front end of the lever arm is implemented by screwing on, which necessarily involves a lengthy assembly time which increases the cost of the operation;

in those cases in which the coupling of the core with the front end of the lever arm is implemented by screwing on, the final position of the knob, that is, its orientation, is fixed by the assembling operative, which can give rise to a certain inconsistency of results;

the fixing of the core on the front end of the lever arm using for the purpose accessory pieces such as screws and retainers results in the first case, in which screws are employed, in a finish which is in certain cases scarcely acceptable, and in the second case, where retainers are used, when maintenance operations have to be carried out which call for uncoupling of the knob from the lever arm, the costs of the operation are relatively high, since said retainer generally has to be replaced.

EXPLANATION OF THE INVENTION

A device of new structure and operation for fixing knobs to lever arms for gearboxes of automobile vehicles is made known hereby in order to provide a solution to all the above-mentioned disadvantages presented by known embodiments of such devices.

The fixing device for knobs of the invention presents the following as its main advantages:

the coupling of the core with the front end of the lever arm is implemented by the sliding of the knob onto said end;

the positioning of the knob with respect to the lever arm does not require complementary pieces such as screws or retainers;

the fixing of the knob onto the front end of the lever arm requires no tools or apparatus at all;

the knob can be coupled and uncoupled frequently without there ever being a need to use any auxiliary part.

The knob fixing device of the invention includes a core of generally long cylindrical shape provided with an axial orifice adapted to permit the coupling by sliding of the core with the corresponding end of the lever arm, the core being provided with means for the fixing of an apron or dust cover which covers the portion of the lever arm between the knob and the bodywork of the vehicle.

The knob fixing device of the invention is characterized in that it includes the following parts:

on the core, and at the open end which receives the lever arm, securing means which include two radial tightening extensions facing each other and with a respective securing projection to their interior, both tightening extensions being linked externally by means of corresponding radial ribs to a circular ring mounted coaxially with respect to the core, and on the closed end and to the interior, a positioning projection mounted axially;

on the lever arm, at the central portion thereof, a coaxial securing groove adapted to receive with a snug fit the securing projections of the axial tightening projections of the core, and on its front end, an axial positioning groove which, starting from the edge of said end, is so dimensioned as to house with a snug fit the positioning projection of the closed end of the core, all this so adapted that when the lever arm is inserted into the core the axial tightening extensions and the circular ring of the core undergo elastic deformation, and during the slide-coupling of the core on the lever arm, the positioning projection of the core is housed in the axial positioning groove of the lever arm and the securing projections of the core are housed in the coaxial securing groove of the lever arm by elastic reaction of said axial tightening extensions and circular ring.

According to another characteristic of the fixing device of the invention, the fixing projections of the tightening extensions of the core form a tubular passage whose receiving opening on the front end of the lever arm presents a configuration of generally truncated-cone shape.

BRIEF DESCRIPTION OF THE DRAWINGS

The drawing sheets of the present specification show, by way of non-restrictive example, the device for fixing knobs to lever arms for gearboxes of automobile vehicles of the invention. In said drawings.

DETAILED DESCRIPTION OF THE EXAMPLE OF EMBODIMENT

Figure 1:
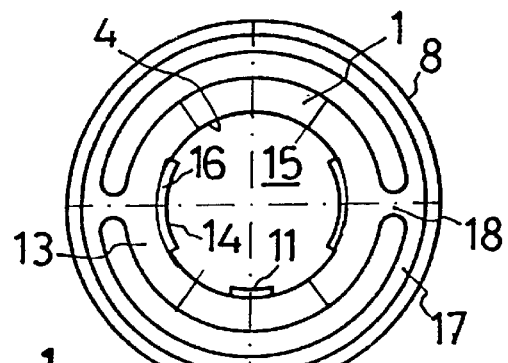
FIG. 1 is a plan view of a core for knobs of lever arms.
Figure 2:
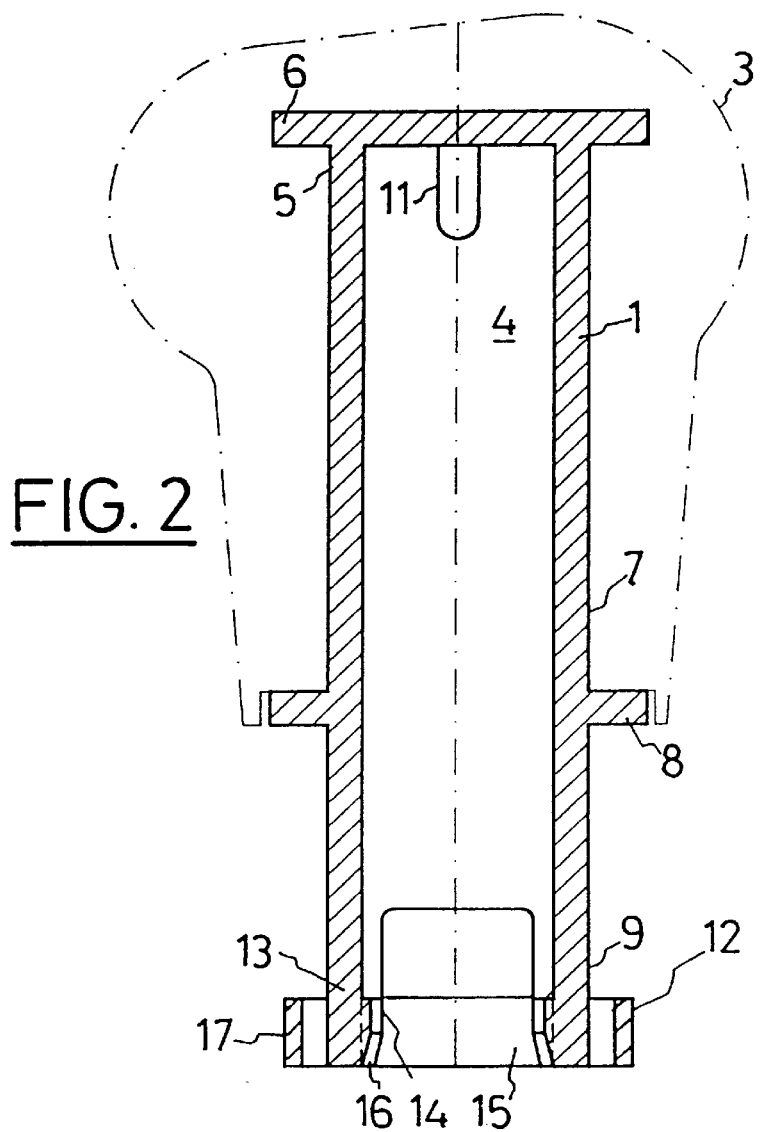
FIG. 2 is a view corresponding to a longitudinal section of the core shown in FIG. 1.
Figure 3:
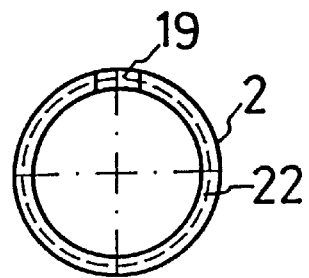
FIG. 3 is a plan view of a lever arm for gearboxes.
Figure 4:
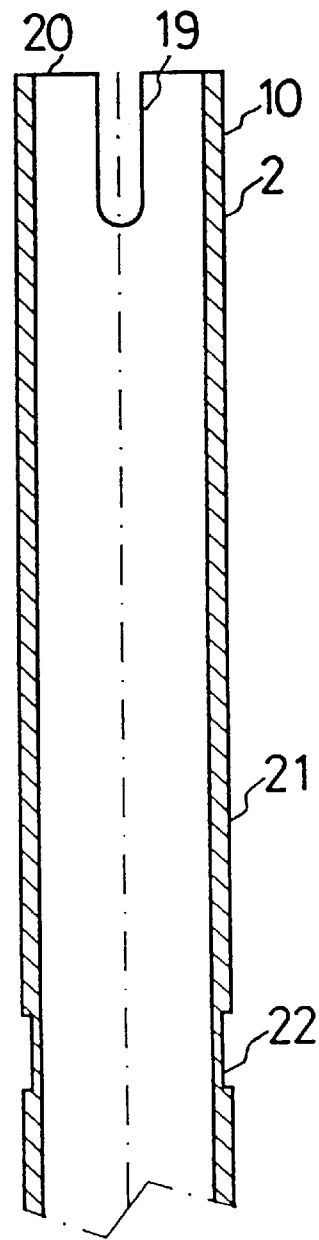
FIG. 4 is a view corresponding to a longitudinal section of the lever arm shown in FIG. 3.
Figure 5:
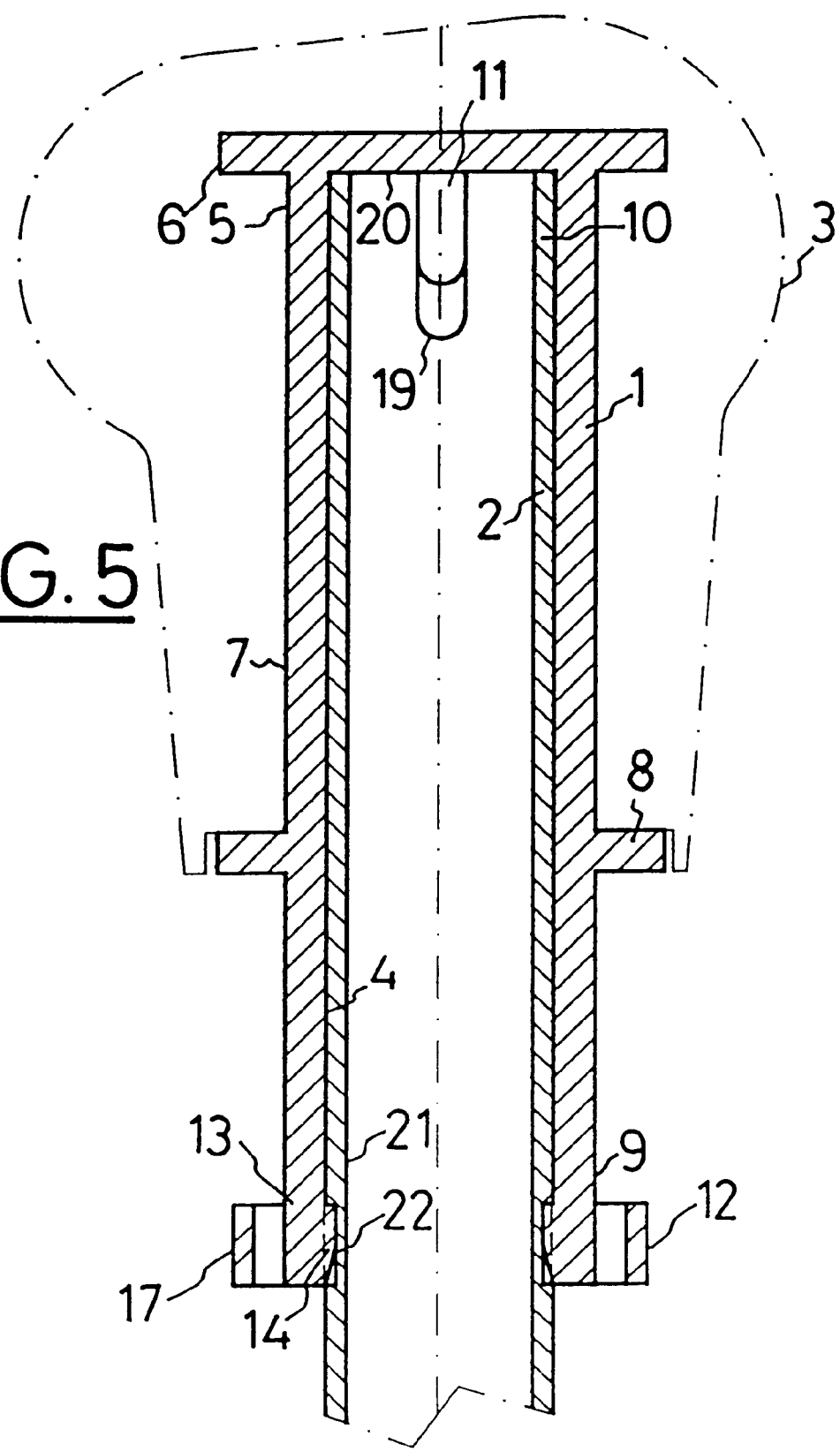
FIG. 5 is a longitudinal section view of the coupling by means of the fixing device of the invention of the core and the lever arm shown in FIGS. 1 to 4.

The device of the invention for fixing knobs to lever arms for automobile vehicle gearboxes which is described as an example of embodiment serves to couple a core 1, shown in FIGS. 1 and 2, with a lever arm 2, shown in FIGS. 3 and 4, in the manner shown in FIG. 5. The core 1 is provided with a handle 3 which is represented by dotted lines in FIGS. 2 to 5. It is understood that said handle 3 can adopt any other configuration and can incorporate any other accessory items, such as a trade mark sign, without this affecting the essential nature of the invention. For the purposes of greater clarity of outline, the core 1 is shown without the apron or dust cover, generally of flexible material, which usually covers the portion of the lever arm 2 between the knob and the bodywork of the vehicle. The core 1 can incorporate any parts needed to secure said apron or dust cover without this affecting the essential nature of the invention. And, also for reasons the same as those noted above, the lever arm 2 has been shown only partially, leaving out as being unnecessary the details inherent to its passage through the bodywork of the vehicle.

FIGS. 1 and 2 show how the core 1, which is preferably made of a highly flexible plastic material, has a long cylindrical general shape and is provided with an axial orifice 4 so dimensioned that the lever arm 2 can slide through it with a snug fit. The closed end 5 of the core 1 has an orthogonal extension 6 of circular outline which has the purpose of coupling the handle 3 with the core 1 and preventing it from becoming detached. Moreover, the central portion 7 of the core 1 has a centred extension 8, also of circular outline, which functions as a seat for the handle 3. And between the open end 9 of the core 1 and said centred extension 8 are means, not shown, for securing the said apron or dust cover.

FIGS. 3 and 4 shown how the lever arm 2 has a tubular configuration open at its front end 10.

The above description in relation to the core 1 and the lever arm 2 is known and widely used in many known embodiments of couplings of knobs to lever arms for automobile vehicle gearboxes.

FIG. 2 shows how at the closed end 5 of and inside the core 1 there is an axially arranged positioning projection 11. Furthermore, the open end 9 of the core 1 has securing means 12 which include two axial tightening extensions 13 facing each other, each one of which has a respective securing projection 14 which, as FIG. 1 shows, forms a tubular passage 15 with a receiving opening 16 of truncated-cone configuration to take the lever arm 2. Coaxially arranged with respect to the core 1, the securing means 12 further include a circular ring 17 linked to both axial tightening extensions 13 by means of respective radial ribs 18 shown in FIG. 1.

FIGS. 3 and 4 show how the front end 10 of the lever arm 2 has an axially arranged positioning groove 19 which starts from the edge 20 of said end 10. The positioning groove 10 is so dimensioned as to correspond with the positioning projection 11 of the core 1, in such a way that said projection 11 can be housed with a snug fit in the groove 19. On its central portion 21, the lever arm 2 has a coaxial securing groove 22 whose dimensions correspond with the securing projections 14 of the axial tightening extensions 13 of the core 1, in such a way that said projections 14 can be housed with a snug fit in the groove 22.

It can be understood that the relative positions of the positioning groove 19 of the front end 10 of the lever arm 2 and of the positioning projection 11 of the closed end 5 of the core 1 correspond with the working position envisaged for the handle 3, that is, said relative positions are determined in function of the possible asymmetry of the handle 3, of vehicle-driving ergonomy factors and of additional parts incorporated into the handle 3, such as trade mark emblems.

There follows a description of the coupling of the core 1 with the lever arm 2 by means of the fixing device of the invention. Firstly, the front end 10 of the lever arm 2 is inserted into the tubular passage 15 formed by the securing projections 14 of the axial tightening extensions 13, this insertion being facilitated by the truncated-cone opening 16 formed by said projections 14. Said insertion is carried out by elastically deforming the axial tightening extensions 13 and the circular ring 17, in such a way that by elastic reaction the securing projections 14 press upon the lever arm 2. The core 1 is then slid on the lever arm 2, and this sliding proceeds until the positioning projection 11 of the core 1 rests on the edge 20 of the front end 10 of the lever arm 2. The knob-fitting operative has then simply to position the knob while at the same time pushing downward to a certain extent, doing so until the positioning projection 11 of the core 1 is facing the positioning groove 19 of the lever arm 2, at which time the core continues to slide and the positioning projection 11 is housed in the positioning groove 19. Said sliding continues until the moment when, by elastic reaction, the securing projections 14 of the axial tightening extensions 13 are housed in the coaxial securing groove 22 of the lever arm 2. At this point the core 1, and therefore the knob, are suitably positioned and secured to the lever arm 2, so that under normal conditions of usage the core 1 cannot be rotated around the lever arm 2 and cannot be detached from said arm 2.

Where vehicle maintenance needs call for removal of the knob from the lever arm 2, the user, simply by pressing diametrally on the circular ring 17 of the securing means 12, brings about elastic separation of the tightening extensions 13 and consequent extraction of its securing projections 14 from the coaxial securing groove 22 of the lever arm 2. The core 1 is thus released from the lever arm 2 and in a position to be removed simply by pushing outwards, leaving the fixing device of the invention, once the knob has been withdrawn from the lever arm 2, in the initial situation described earlier.

What is claimed is:

1. A device for fixing knobs to lever arms for gearboxes of automobile vehicles, which includes a core (1) of generally long cylindrical shape provided with an axial orifice (4) adapted to permit the coupling by sliding of the core (1) with the corresponding end (10) of the lever arm (2), the core (1) being provided with means for the fixing of an apron or dust cover which covers the portion of the lever arm between the knob and the bodywork of the vehicle, characterized in that on the core (1), and at the open end (9) which receives the lever arm (2), there are securing means (12) which include two radial tightening extensions (13) facing each other and with a respective securing projection (14) to their interior, both tightening extensions (13) being linked externally by means of corresponding radial ribs (18) to a circular ring (17) mounted coaxially with respect to the core (1), and on the closed end (5) and to the interior, a positioning projection (11) mounted axially, and on the lever arm (2), at the central portion (21) thereof, a coaxial securing groove (22) adapted to receive with a snug fit the securing projections (14) of the axial tightening projections (13) of the core (1), and on its front end (10), an axial positioning groove (19) which, starting from the edge (20) of said end (10), is so dimensioned as to house with a snug fit the positioning projection (11) of the closed end (5) of the core (1), all this so adapted that when the lever arm (2) is inserted into the core (1) the axial tightening extensions (13) and the circular ring (17) of the core (1) undergo elastic deformation, and during the slide-coupling of the core (1) on the lever arm (2), the positioning projection (11) of the core (1) is housed in the axial positioning groove (19) of the lever arm (2) and the securing projections (14) of the core (1) are housed in the coaxial securing groove (22) of the lever arm (2) by elastic reaction of said axial tightening extensions (13) and circular ring (17).

2. A fixing device as claimed in claim 1, characterized in that the securing projections (14) of the tightening extensions (13) of the core (1) form a tubular passage (15) whose receiving opening (16) on the front end (10) of the lever arm (2) presents a configuration of generally truncated-cone shape.

* * * * *